United States Patent
Hirao

(10) Patent No.: US 8,983,737 B2
(45) Date of Patent: Mar. 17, 2015

(54) SEAT WITH MIDDLE BEND MECHANISM

(75) Inventor: Akinari Hirao, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/118,326

(22) PCT Filed: Mar. 5, 2012

(86) PCT No.: PCT/JP2012/055556
§ 371 (c)(1),
(2), (4) Date: Nov. 18, 2013

(87) PCT Pub. No.: WO2012/157321
PCT Pub. Date: Nov. 22, 2012

(65) Prior Publication Data
US 2014/0077560 A1    Mar. 20, 2014

(30) Foreign Application Priority Data
May 19, 2011   (JP) .................................. 2011-112206

(51) Int. Cl.
| G06F 7/00 | (2006.01) |
| A47C 1/024 | (2006.01) |
| B60N 2/22 | (2006.01) |
| B60N 2/02 | (2006.01) |

(52) U.S. Cl.
CPC ............ *B60N 2/2222* (2013.01); *B60N 2/0232* (2013.01); *B60N 2/02* (2013.01); *B60N 2/0296* (2013.01); *B60N 2/22* (2013.01); *B60N 2205/30* (2013.01); *B60N 2002/0272* (2013.01); *B60N 2002/0216* (2013.01)

USPC .......................................... 701/49; 297/301.5

(58) Field of Classification Search
USPC ............ 701/36, 49; 297/301.1, 301.5, 301.6, 297/283.1, 283.2, 383.3
See application file for complete search history.

(56) References Cited

U.S. PATENT DOCUMENTS

| 7,344,195 B2 * | 3/2008 | Folkert et al. .............. 297/378.1 |
| 2006/0001305 A1 * | 1/2006 | Christopher et al. ......... 297/331 |
| 2008/0272637 A1 * | 11/2008 | Czinki et al. ................ 297/301.5 |
| 2009/0230744 A1 * | 9/2009 | Szybisty et al. .............. 297/335 |
| 2010/0066145 A1 * | 3/2010 | Akutsu ....................... 297/301.5 |
| 2011/0057492 A1 * | 3/2011 | Nakamura et al. ......... 297/301.4 |
| 2013/0175838 A1 * | 7/2013 | Oshima et al. ............. 297/284.3 |

FOREIGN PATENT DOCUMENTS

| JP | 7-81468 A | 3/1995 |
| JP | 9-109747 A | 4/1997 |
| JP | 2579110 Y2 | 8/1998 |
| JP | 2004-81355 A | 3/2004 |

\* cited by examiner

*Primary Examiner* — Yonel Beaulieu
(74) *Attorney, Agent, or Firm* — Foley & Lardner LLP

(57) ABSTRACT

A seat includes a seat cushion, and a seat back divided into an upper seat back and a lower seat back. The upper seat back and the lower seat back are connected in a way that their respective angles can be adjusted. The seat further includes a recliner drive part capable of varying a reclining angle which is an angle of the lower seat back to the seat cushion, and a middle bend drive part capable of varying a middle bend angle which is an angle of the upper seat back to the lower seat back. The seat additionally includes a control part configured to perform interlock control for interlocking the reclining angle and the middle bend angle on the basis of a predetermined interlock function.

4 Claims, 4 Drawing Sheets

SEAT WITH MIDDLE BEND MECHANISM

TECHNICAL FIELD

The present invention relates to a seat in which an upper seat back and a lower seat back are connected together in a way that their respective angles can be adjusted.

BACKGROUND ART

Patent Literature 1, for example, has proposed a vehicle seat having a middle bend structure in which a seat back is divided into upper and lower halves. This type of vehicle seats includes one which has a motor configured to recline the lower seat back and a motor configured to bend the upper seat back at its middle, and which enables the lower seat back and the upper seat back to be inclined by use of the respective motors.

CITATION LIST

Patent Literature

Patent Literature 1: Registered Japanese Utility Model No. 2579110

SUMMARY OF INVENTION

The foregoing seat structure, however, requires a user to adjust the inclinations of the lower and upper seat backs by driving the lower and upper seat backs independently of each other through the user's switch manipulation. This increases the degree of freedom of adjustment, and makes the manipulation complicated. In addition, the structure like this makes it difficult to adjust the seat suitably for the occupant, because the inclinations of the upper and lower seat backs are adjusted by driving the upper and lower seat backs independently of each other through the user's switch manipulation.

The present invention has been made to solve the foregoing problem. An object of the present invention is to provide a vehicle seat which enables the reclining angle of the lower seat back and the middle bend angle of the upper seat back to be easily adjusted to the respective angles suitable for the occupant without requiring the reclining angle and the middle bend angle to be adjusted independently of each other.

Specifically, the present invention provides a seat which includes a seat cushion, and a seat back divided into an upper seat back and a lower seat back, the upper seat back and the lower seat back being connected in a way that their respective angles can be adjusted. The seat also includes recliner drive means capable of varying a reclining angle which is an angle of the lower seat back to the seat cushion, and middle bend drive means capable of varying a middle bend angle which is an angle of the upper seat back to the lower seat back. The seat further includes a control part configured to perform interlock control for interlocking the reclining angle and the middle bend angle on the basis of a predetermined interlock function.

DESCRIPTION OF EMBODIMENTS

Figure 1:
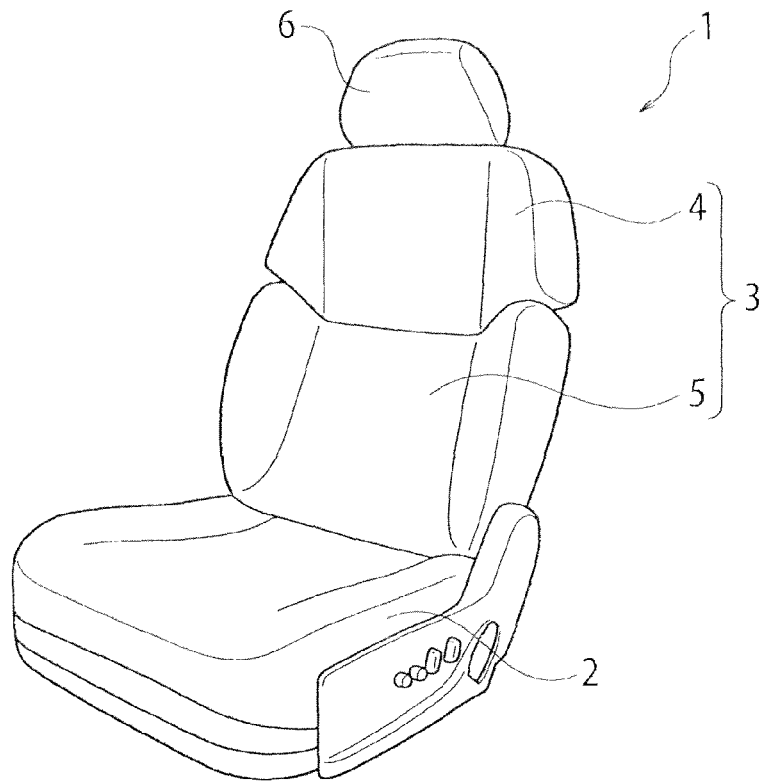
FIG. 1 is a perspective view of a seat according to an exemplary embodiment of the present invention.

Using an example where a seat of the present invention is applied as a vehicle seat, a concrete embodiment of the present invention will be described in detail below by referring to the drawings. Dimensional ratios in the drawings may be exaggerated for the sake of explanatory convenience, and may be different from the actual ratios.

As shown a perspective view of FIG. 1, a seat 1 according to exemplary embodiment of the present invention includes a seat cushion 2 and a seat back 3. The seat back 3 is divided into an upper seat back 4 and a lower seat back 5. This seat further includes a reclining mechanism capable of varying a reclining angle, and a middle bend mechanism capable of varying a middle bend angle. In this respect, the reclining angle is an angle of the lower seat back 5 to the seat cushion 2. In addition, the middle bend angle is an angle of the upper seat back 4 to the lower seat back 5. Incidentally, a headrest 6 is attached to the upper seat back 4.

Figure 2:
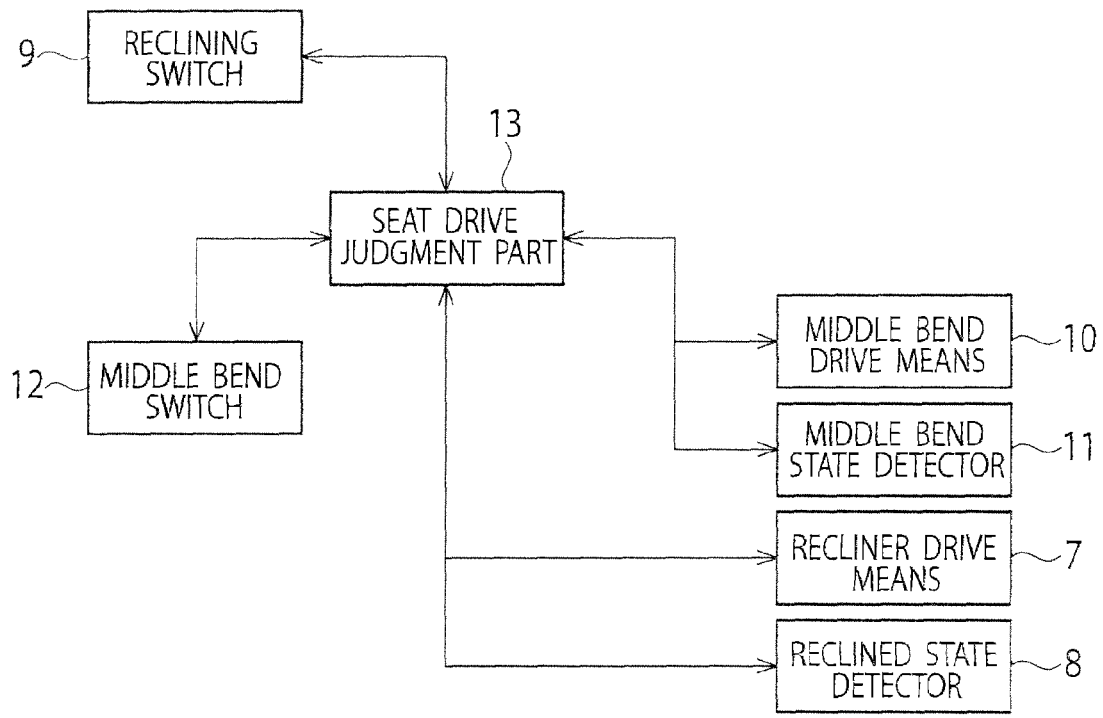
FIG. 2 is a block diagram of a drive control device for the seat according to the exemplary embodiment of the present invention.

FIG. 2 shows a block diagram of a drive control device configured to adjust the reclining angle and the middle bend angle. The drive control device includes the reclining mechanism, the middle bend mechanism and a seat drive judgment part 13. In this respect, the reclining mechanism includes recliner drive means 7, a reclined state detector 8 and a reclining switch 9. In addition, the middle bend mechanism includes middle bend drive means 10, a middle bend state detector 11 and a middle bend switch 12.

The recliner drive means capable of varying the reclining angle by inclining the lower seat back 5 forward or backward through the driving of a reclining motor. The reclined state detector 8 is formed from a reclining sensor configured to detect the reclining angle.

The middle bend drive means 10 is capable of varying the middle bend angle by inclining the upper seat hack 4 forward or backward through the driving of a middle bend motor. The middle bend state detector 11 is formed from a middle bend sensor configured to detect the middle bend angle.

The seat drive judgment part 13 functions as a control part configured to perform interlock control for interlocking the detected reclining and middle bend angles on the basis of a predetermined interlock function. Incidentally, the interlock function, which will be described in detail later, is a function concerning the reclining and middle bend angles.

Figure 3:
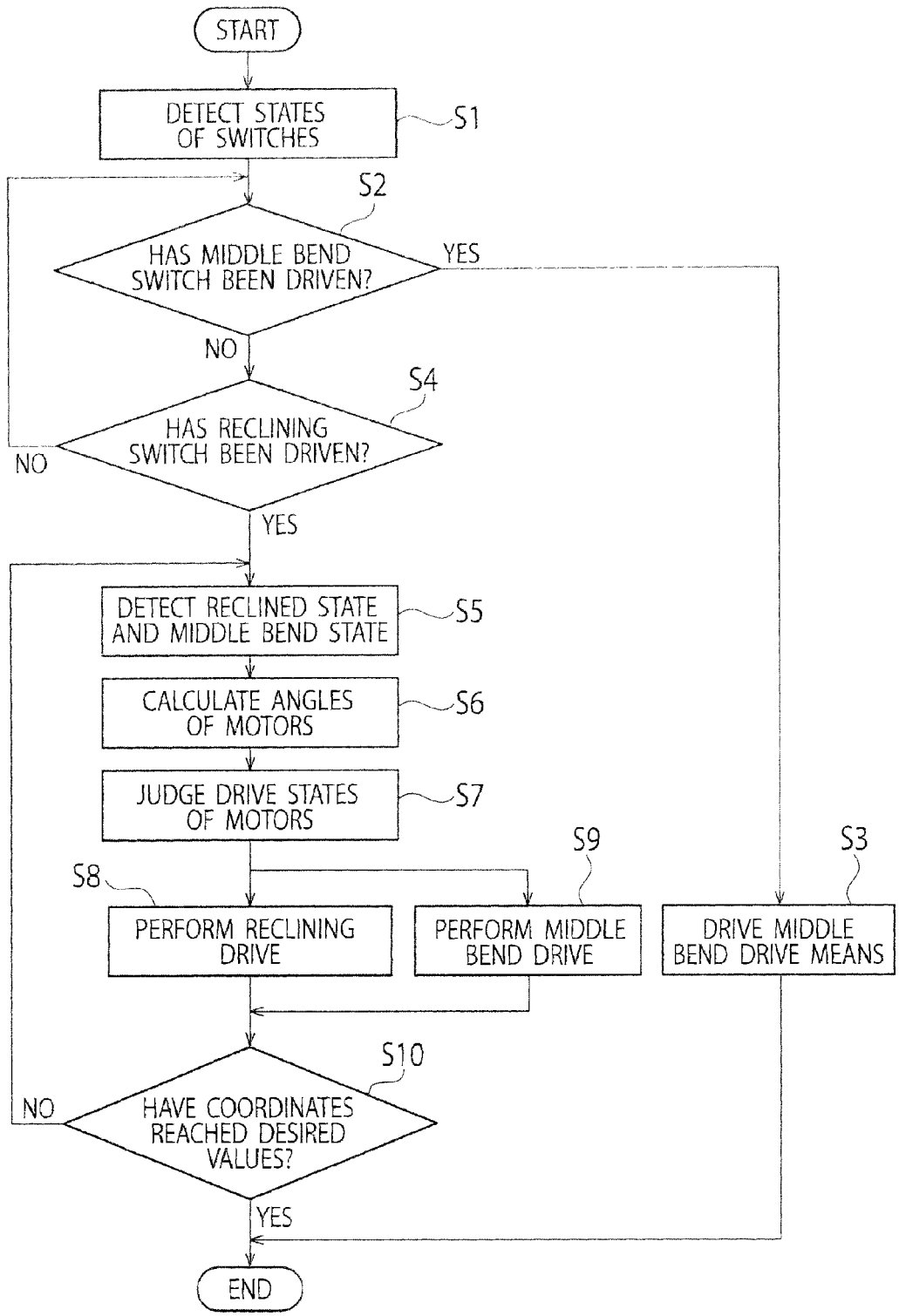
FIG. 3 is a flowchart illustrating how drive control is performed on the seat according to the exemplary embodiment of the present invention.

FIG. 3 is a flowchart illustrating how drive control is performed on the seat according to the exemplary embodiment of the present invention. The flowchart starts with the turning on of an ignition key of an engine. In a process in step S1, the reclined state detector 8 detects the relined state, while the middle bend state detector 11 detects the middle bend state.

In a process in step S2, the seat drive judgment part 13 detects whether or not the middle bend switch 12 has been driven (pressed). If the middle bend switch 12 has been driven (YES), the seat drive judgment part 13 drives the middle bend drive means 10 in a process in step S3.

If the middle bend switch 12 has not been driven (NO), the seat drive judgment part 13 detects, in a process in step S4, whether or not the reclining switch 9 has been driven (pressed). If the reclining switch 9 has been driven (YES), the seat drive judgment part 13 issues instructions to the reclined state detector 8 and the middle bend state detector 11, respectively, in a process in step S5. Thereby, the reclined state detector 8 and the middle bend state detector 11 detect the reclined state and the middle bend state, respectively.

Specifically, in a process in step S6, the reclining sensor (the reclined state detector 8) detects the current rotational angle of the reclining motor (the recliner drive means 7), and the seat drive judgment part 13 calculates the angle of the reclining motor. Similarly, in the process in stop S6, the middle bend sensor (the middle bend state detector 11) detects the current rotational angle of the middle bend motor (the middle bend drive means 10), and the scat drive judgment part 13 calculates the angle of the middle bend motor.

In a process in step S7, a judgment is made on the drive states of the reclining motor and the middle bend motor. It is assumed that a relationship between the reclining angle and the middle bend angle which is predetermined by the interlock function is one in which the middle bend angle and the reclining angle are equal to each other. This is represented by the straight line X in FIG. 4. It is a matter of course that the interlock function of the present invention is not limited to a linear function and can be represented by a straight line or a curve. First of all, it is assumed that the coordinates corresponding to the reclining angle and the middle bend angle which are detected respectively by the reclined state detector 8 and the middle bend state detector 11 are on the straight line X representing the above-described interlock function. In this case, as shown FIG. 4, the reclining motor and the middle bend motor are driven such that the coordinates corresponding to the reclining angle and the middle bend angle can move along the straight line X representing the interlock function. During this movement, the two motors are driven in accordance with a switch manipulation direction (a forward inclination direction or a backward inclination direction) of the reclining switch 9 while constantly detecting the angles.

Figure 5:
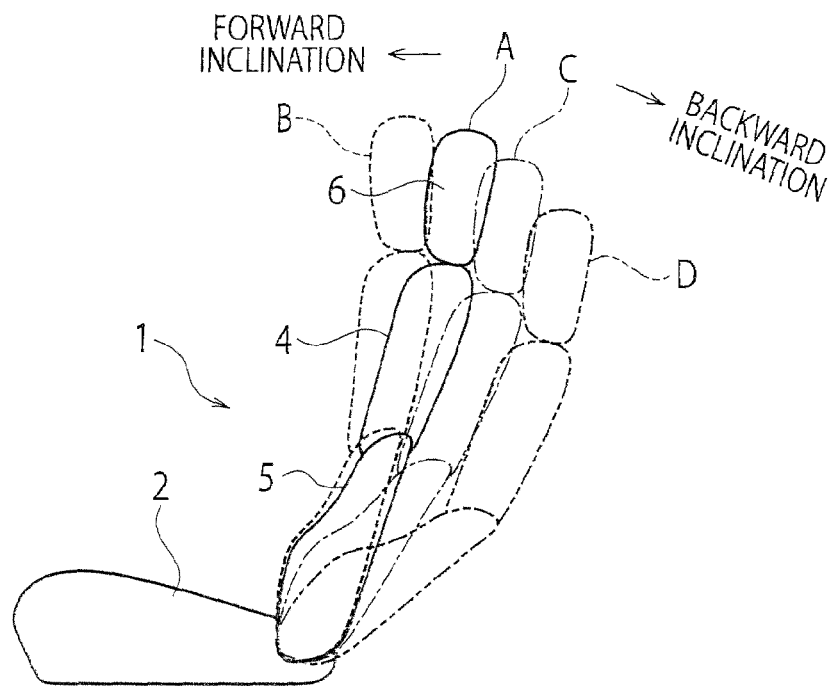
FIG. 5 is a diagram illustrating how a seat angle varies when the reclining angle is changed and the middle bend angle is changed by following the change in the reclining angle.

Once the reclining switch 9 is manipulated such that the lower seat back 5 inclines forward, the lower seat back 5 inclines forward, for example, from a state "A" indicated with a solid line to a state "B" indicated with a dotted line in FIG. 5. With this forward inclination, processes in steps S8 and S9 are performed and the upper seat back 4 inclines backward. As a result, the seat back as a whole moves in an opening direction. On the other hand, once the reclining switch 9 is manipulated such that the lower seat back 5 inclines backward, the lower seat back 5 inclines backward from the state "A" indicated with the solid line to a state "C" indicated with a chain dashed line or a state "D" indicated with a chain double-dashed line in FIG. 5. With the backward inclination, the processes in steps S8 and S9, are performed and the upper seat back 4 inclines forward. As a result, the seat back as a whole in a closing direction.

Figure 4:
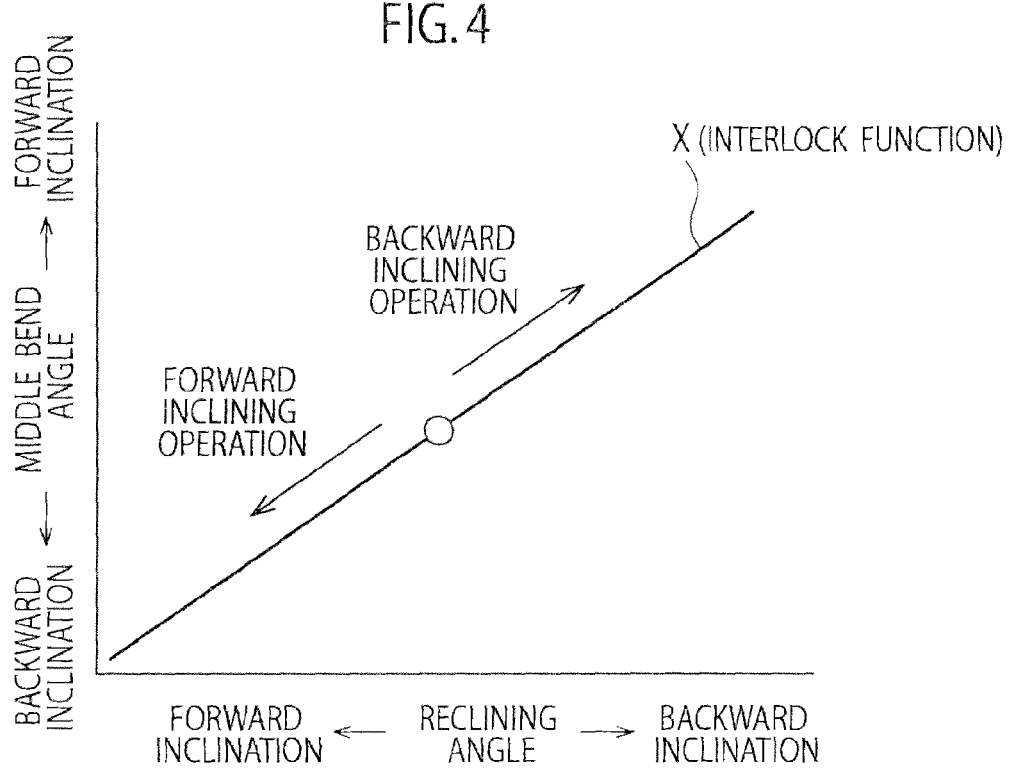
FIG. 4 is a diagram illustrating an operational pattern which is followed when coordinates corresponding to detected reclining and middle bend angles are on a straight line representing an interlock function.

The operation mechanism like this enables the two sections, namely the upper seat back 4 and the lower seat back 5, to be automatically adjusted in terms of their angles when the occupant manipulates only the reclining switch 9 in the process in step S4. In addition, since the predetermined interlock function shown in FIG. 4 is set to a comfortable middle bend angle for each reclining angle, the seat back is capable of taking on a comfortable shape for any reclining angle.

Thereafter, in a process in step S10, it is judged that the coordinates corresponding to the reclining angle and the middle bend angle reach their desired values, when the coordinates lie on the straight line X representing the interlock function as a result of the drive control. Then, the flowchart in FIG. 3 is ended. If neither the reclining angle nor the middle bend angle reaches its desired value, in other words, if the coordinates are not on the straight line X representing the interlock function, the flowchart returns to the process in step S5.

In the foregoing flowchart, if the coordinates corresponding to the detected reclining and middle bend angles are not on the straight line X representing the interlock function, the control is performed in a way that the control to be performed when the manipulation direction of the reclining switch is a backward inclination direction and the control to be performed when the manipulation direction thereof is a forward inclination direction are different from each other.

Figure 6:
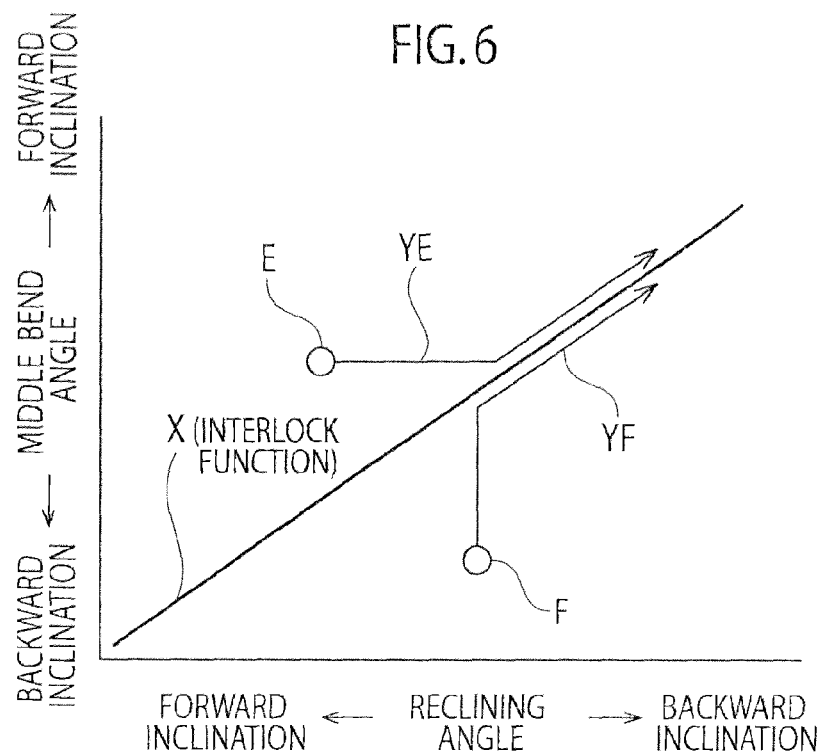
FIG. 6 is a diagram illustrating how an operation is performed to incline the lower seat back backward when interlock control is started in a case where an angle determined by the interlock function on the basis of one of the reclining and middle bend angles is not equal to the other of the reclining and middle bend angles.

First of all, referring to FIG. 6, descriptions will be provided for how the control is performed when the manipulation direction of the reclining switch is the backward inclination direction. It is assumed that a detected current middle bend angle "E" is larger than a middle bend angle which is determined by the interlock function on the basis of a current reclining angle. In this case, the lower seat back 5 is inclined backward until the current reclining angle becomes equal to a reclining angle which is determined by the interlock function on the basis of the middle bend angle "E". Thereafter, once the current reclining angle becomes equal to the determined reclining angle, the drive control is performed in accordance with the straight line X representing the interlock function in a way that the control corresponds to an operation indicated with a line YE in FIG. 6.

On the other hand, it is assumed that a detected current middle bend angle "F" is smaller than a middle bend angle which is determined by the interlock function on the basis of a current reclining angle. In this case, the upper seat back 4 is inclined forward until the current middle bend angle "F" becomes equal to the middle bend angle which is determined by the interlock function on the basis of the detected current reclining angle. Thereafter, once the current middle bend angle "F" becomes equal to the determined middle bend angle, the drive control is performed in accordance with the straight line X representing the interlock function in a way that the control corresponds to an operation indicated with a line YF in FIG. 6.

The foregoing operations avoid unnecessary drive in the forward inclination direction during the reclining movement when the occupant manipulates the reclining switch in the backward inclination direction. Consequently, the backward inclination can be achieved without giving a feeling of discomfort, and a comfortable seat back shape can be obtained.

Figure 7:
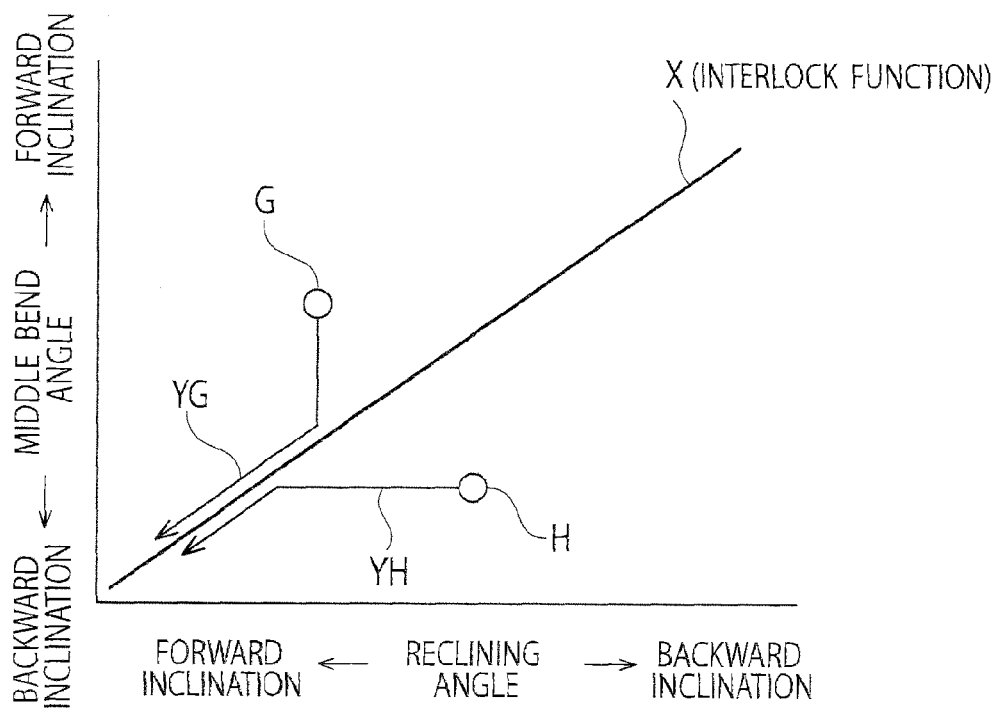
FIG. 7 is a diagram illustrating how an operation is performed to incline the lower seat back forward when the interlock control is started in the case where the angle determined by the interlock function on the basis of one of the reclining and middle bend angles is not equal to the other of the reclining and middle bend angles.

Next, referring to FIG. 7, descriptions will be provided for how the control is performed when the manipulation direction of the reclining switch is the forward inclination direction. It is assumed that a detected current middle bend angle "G" is larger than a middle bend angle which is determined by the interlock function on the basis of a current reclining angle. In this case, the upper seat back 4 is inclined backward to a position which makes the current middle bend angle "G" equal to the middle bend angle which is determined by the interlock function on basis of the current reclining angle. Thereafter, once the current middle bend angle "G" becomes equal to the determined middle bend angle, the drive control is performed in accordance with the straight line X representing the interlock function in a way that the control corresponds to an operation indicated with a line YG in FIG. 7.

On the other hand, it is assumed that a detected current middle bend angle "H" is smaller than a middle bend angle which is determined by the interlock function on the basis of a current reclining angle. In this case, the lower seat back 5 is inclined forward to a position which makes the current reclining angle equal to a reclining angle which is determined by the interlock function on the basis of the middle bend angle "H". Thereafter, once the current reclining angle becomes equal to the determined reclining angle, the drive control is performed in accordance with the straight line X representing the interlock function in a way that the control corresponds to an operation indicated with a line YH in FIG. 7.

The foregoing operations avoid unnecessary drive in the backward inclination direction during the reclining movement, when the occupant manipulates the reclining switch in the forward inclination direction. Consequently, the forward inclination can be achieved without giving a feeling of discomfort, and a comfortable seat back shape can be obtained.

It should be noted that the control for the reclining angle and the middle bend angle to reach their desired angles is usual feedback control on the basis of the values of the motors detected by the sensors and their desired angles, respectively.

The vehicle seat to which the seat of the present invention is applied as described above can obtain the following effects.

(1) The interlock control is performed to interlock the reclining angle and the middle bend angle on the basis of the predetermined interlock function. This makes possible to provide the seat shape comfortable to the occupant with the simple manipulation without requiring the reclining angle of the lower seat back 5 and the middle bend angle of the upper seat back 4 to be adjusted individually or independently.

(2) In addition to the interlock control for interlock the reclining angle and the middle bend angle as shown in the flowchart of FIG. 3, the middle bend angle of the upper seat back 4 can be controlled independently of the reclining angle of the lower seat back 5 in the process in step S2. This makes it possible to set the upper seat back 4 into a middle bend position which the occupant desires.

(3) As the result of adjusting the middle bend angle of the upper seat back 4 independently, the following situation is anticipated. Specifically, it is anticipated that the interlock control is started when a second angle determined by the predetermined interlock function on the basis of a first angle, which is one of the reclining angle and the middle bend angle, is not equal to a third angle which is the other of the reclining angle and the middle bend angle. In this case, either the recliner drive means 7 or the middle bend drive means 10 is operated independently, as well as the third angle and the second angle are thus made equal to each other. Thereafter, once the third angle and the second angle become equal to each other, the control is performed to operate the recliner drive means 7 and the middle bend drive means 10 in accordance with the interlock function in an interlocked manner. Specifically, the operations in steps S5 to S10 and the operations in FIGS. 6 and 7 are performed. For this reason, the recliner drive means and the middle bend drive means can be interlocked without giving a feeling of discomfort in the drive direction for the occupant to recline.

(4) In the control for matching the drive with the interlock function, as to which of the recliner drive means 7 and the middle bend drive means 10 should be operated to perform the foregoing independent operational control is determined depending on the operation of the seat by the occupant. In other words, the choice between the recliner drive means 7 and the middle bend drive means 10 is determined depending on the drive direction in which the occupant inclines the lower seat back 5 forward or backward. On the basis of this determination, the operations in steps S5 to S10 as well as the operations FIGS. 6 and 7 are carried out. For this reason, the reclining and the middle bend can be interlocked without giving a feeling of discomfort in the drive direction for the occupant to recline.

All the contents of Japanese Patent Application No. 2011-112206 (filed on May 19, 2011) are cited herein.

Although the foregoing descriptions have been provided for the contents of the present invention on the basis of the embodiment and the examples, it is obvious to those skilled in the art that: the present invention is not limited to the descriptions and various changes and modifications can be made to the present invention.

For example, although the interlock function is a linear function in the foregoing embodiment, it is possible to perform the same control by using a non-linear function, and to obtain the same effects from the non-liner function.

Furthermore, in the foregoing embodiment, when the reclining switch is manipulated, both the recliner drive means and the middle bend drive means are driven while being controlled; and when the middle bend switch is manipulated, only the middle bend drive means is driven independently. Instead, the functions of the recliner drive means and the middle bend drive means may be interchanged in a way that when the middle bend switch is manipulated, both the recliner drive means and the middle bend drive means are driven while being controlled. In this case, too, the effects which are the same as those of the foregoing embodiment can be obtained.

INDUSTRIAL APPLICABILITY

In the vehicle seat of the present invention, the control part performs the control for interlocking the reclining angle of the lower seat back and the middle bend angle of the upper seat back on the basis of the predetermined interlock function. For this reason, the occupant need not adjust the reclining angle and the middle bend angle independently of each other. In short, a seat angle comfortable to the occupant can be easily obtained through the angle adjustment by the control part.

REFERENCE SIGNS LIST 1 seat
2 seat cushion
3 seat back
4 upper seat back
5 lower seat back
7 recliner drive mean
8 reclined state detector
9 reclining switch
10 middle bend drive means
11 middle bend state detector
12 middle bend switch
13 seat drive judgment part (control part)

The invention claimed is:

1. A seat comprising:
a seat cushion;
a seat back divided into an upper seat back and a lower seat back, the upper seat back and the lower seat back being connected in a way that their respective angles can be adjusted;
a recliner drive part capable of varying a reclining angle which is an angle of the lower seat back to the seat cushion;
a middle bend drive part capable of varying a middle bend angle which is an angle of the upper seat back to the lower seat back; and
a control part configured to perform interlock control for interlocking the reclining angle and the middle bend angle on the basis of a predetermined interlock function, wherein
when the interlock control is started in a case where a second angle determined by the interlock function on the basis of a first angle, which is one of the reclining angle and the middle bend angle, is not equal to a third angle which is the other of the reclining angle and the middle bend angle,
the control part performs control for:
(A1) operating one of the recliner drive part and the middle bend drive part independently until the third angle becomes equal to the second angle; and
(A2) interlocking the recliner drive part and the middle bend drive part in accordance with the interlock function once the third angle becomes equal to the second angle.

2. The seat according to claim 1, wherein the control part is capable of controlling the middle bend angle independently of the reclining angle, in addition to performing the interlock control.

3. The seat according to claim 1, wherein
when the interlock control is started in the case where the second angle determined by the interlock function on the basis of the first angle, which is one of the reclining angle and the middle bend angle, is not equal to the third angle which is the other of the reclining angle and the middle bend angle,
depending on a drive direction in which the lower seat back is to be inclined forward or backward, the control part performs control for matching one of the middle bend angle and the reclining angle with the interlock function, and then matching the other of the middle bend angle and the reclining angle with the interlock function.

4. A seat comprising:
a seat cushion;
a seat back divided into an upper seat back and a lower seat back, the upper seat back and the lower seat back being connected in a way that their respective angles can be adjusted;
recliner drive means capable of varying a reclining angle which is an angle of the lower seat back to the seat cushion;
middle bend drive means capable of varying a middle bend angle which is an angle of the upper seat back to the lower seat back; and
a control part configured to perform interlock control for interlocking the reclining angle and the middle bend angle on the basis of a predetermined interlock function, wherein
when the interlock control is started in a case where a second angle determined by the interlock function on the basis of a first angle, which is one of the reclining angle and the middle bend angle, is not equal to a third angle which is the other of the reclining angle and the middle bend angle,
the control part performs control for:
(A1) operating one of the recliner drive means and the middle bend drive means independently until the third angle becomes equal to the second angle; and
(A2) interlocking the recliner drive means and the middle bend drive means in accordance with the interlock function once the third angle becomes equal to the second angle.

* * * * *